United States Patent [19]
Ando et al.

[11] Patent Number: 4,868,924
[45] Date of Patent: Sep. 19, 1989

[54] CASSETTE LOADING DEVICE

[75] Inventors: Masahiro Ando; Osamu Morita, both of Kanagawa; Kazunori Kashimura, Tokyo; Takahide Sasaki, Kanagawa; Kouichi Chikamoto, Kanagawa; Koji Takahasi, Kanagawa; Kenichi Nagasawa, Kanagawa, all of Japan

[73] Assignee: Canon Kabushiki Kaisha, Tokyo, Japan

[21] Appl. No.: 34,852

[22] Filed: Apr. 3, 1987

[30] Foreign Application Priority Data

Apr. 9, 1986 [JP] Japan .................................. 61-82938
Apr. 9, 1986 [JP] Japan .................................. 61-82939
Jul. 23, 1986 [JP] Japan ................................. 61-174048

[51] Int. Cl.⁴ ............................................ G11B 15/00
[52] U.S. Cl. .................................... 360/96.5; 242/199
[58] Field of Search ............................... 360/96.5, 71; 242/197–200

[56] References Cited
U.S. PATENT DOCUMENTS 4,424,540 1/1984 Naoi .................................. 360/96.5
4,561,031 12/1985 Tanabe .............................. 360/96.5
4,628,382 12/1986 Okumura ....................... 360/96.5 X
4,661,867 4/1987 Tsubota ............................. 360/96.5

Primary Examiner—A. J. Heinz
Attorney, Agent, or Firm—Robin, Blecker & Daley

[57] ABSTRACT

A cassette loading device is disclosed. In a device wherein a cassette accomodating a recording medium is inserted and loaded in the device body and a signal is recorded on and/or reproduced from the recording medium which has completely been loaded therein, the cassette loading device characterised in that a plurality of positions of a movable holding member for holding the cassette are detected by detecting the rotational phases of a rotary disk which rotates together with the movement of the holding member between an inserting position of the cassette and a position in which it is completely loaded.

19 Claims, 11 Drawing Sheets

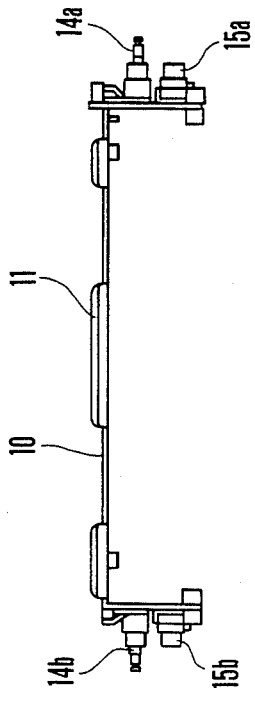
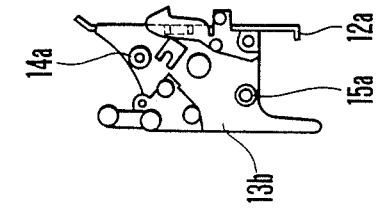
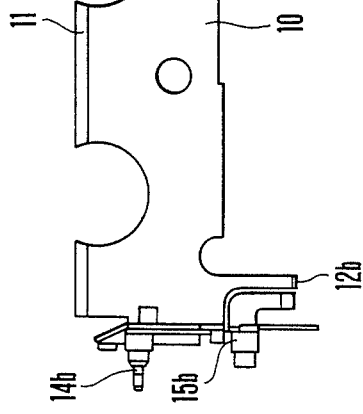
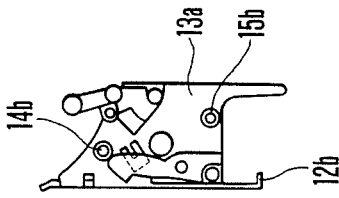
FIG.2 (A)
FIG.2 (B)
FIG.2 (C)
FIG.2 (D)

CASSETTE LOADING DEVICE

BACKGROUND OF THE INVENTION

1. Field of the Invention

The present invention is directed to a cassette loading device, and more particularly, to a cassette loading device for automatically guiding a cassette to a recording and/or reproducing device and loading it therein.

2. Description of the Related Art

This kind of cassette loading device has heretofore been employed for, for instance, a helical scan type VTR. The description in the specification of the present invention will therefore be made by exemplifying the cassette loading device employed for the VTR of this type.

Especially, a so-called installation type VTR which performs picture recording/reproducing operations in TV broadcasting is in general invested with a function to automatically guide a cassette holder from a position in which the user inserts it to a position in which the picture recording/reproducing operations can be carried out. The cassette and the holder for holding the cassette are guided to a predetermined position within the VTR body and are then loaded therein simply by inserting the cassette into a insertion port with the help of, for example, a so-called front loading mechanism. In that position, the picture recording/reproducing operations are effected while winding a tape of the cassette on a rotary drum by a so-called tape loading mechanism.

In the above-described device, however, the cassette is automatically loaded by moving a holding member (a cassette holder) for holding the cassette after detecting such a step that the cassette has been inserted by the user and the cassette holder has moved a given distance away from an initial position. For this reason, it is required to detect the position of the predetermined distance at which the cassette holder moves. Upon a completion of the loading of the cassette, the cassette holder has to cease its movement and hence it is necessary to detect the position of the cassette holder just when completing the loading of the cassette.

When taking out the cassette, it is also needed to detect the fact that the cassette holder is in the intial position because of the necessity for halting the movement of the cassette holder after making the cassette holder revert to the initial position in the light of facilitating the operation of taking out the cassette.

A plurality of positions of the cassette holder are spaced away from each other on the device. Therefore, if a detecting switch is provided on the side of the device body, a cord (a wire) for obtaining a signal from the detecting switch increases in length, this conducing to defects wherein the VTR becomes intricate of constituion and both miniaturization and reduction in weight of the device are hindered.

The switch is attached to the cassette holder, which arrangement requires a single switch alone. However, the wire also undesirably moves when installing the wire to the movable holder.

Such is the general constitution that, when the user inserts the cassette in the VTR, unless a certain surface of the cassette has to be turned in a predetermined direction, the insertion is not made at all. Inasmuch as the individual surfaces of the tape cassette commonly, as illustrated in FIG. 1, assume different configurations from each other, the insertion of an erroneous surface of the cassette or in an erroneous direction (misinsertion) is prohibited by mechanically or electrically detecting the difference in configuration. With this arrangement, the cassette 1 is, as indicated by an arrowhead 2 of FIG. 1, invariably inserted into the cassette insertion port (shown by the numeral 3 of FIG. 1) formed in the VTR body.

Even in the case of inserting the proper surface of the cassette into the cassette insertion port or inserting it in the adequate direction, however, an abrupt insertion of the cassette causes impact on the cassette holder, whereby a mechanism for driving the cassette holder does not normally function in some cases. This will bring about damages in the cassette, the holder mechanism, the tape and so on.

SUMMARY OF THE INVENTION

It is a primary object of the present invention which obviates the above-described problems to provide a cassette loading device capable of detecting a plurality of positions of a cassette holding member without moving a signal transmitting wire whose length is relatively short.

For this purpose, as one embodiment of the present invention, there is exhibited a device which comprises: a holding member for holding a cassette which accomodates a recording medium; a moving mechanism for moving the holding member from a position in the vicinity of a cassette insertion port, formed in a recording and/or reproducing device, for insertion of the cassette to a position in which a signal can be recorded on and/or reproduced from the recording medium by means of the recording and/or reproducing device; a rotary member rotating together with the movement of the holding member; and detecting means for detecting a plurality of rotational phases of the rotary member.

According to one aspect of the invention, there is provided a cassette loading device capable of preventing creation of damages in individual members which are to be caused by an abrupt insertion of the cassette.

To accomplish this object, as another embodiment of the present invention, there is exhibited a device which comprises: a holding member for holding a cassette for accomodating a recording medium; a moving mechanism for moving the holding member from a position in the vicinity of a cassette insertion port, formed in a recording and/or reproducing device, for insertion of the cassette to a position in which a signal can be recorded on and/or reproduced from the recording medium by means of the recording and/or reproducing device; detecting means for detecting the fact that the holding member is in a first position in the proximity of the cassette insertion port, formed in the recording and/or reproducing device, for insertion of the cassette and in a second position; judging means for judging whether a time for which the detecting means detects the fact that the holding member is in the second position after detecting the fact that the holding member is in the first position falls within a predetermined period of time or not; and prohibiting means for prohibiting the holding member from moving from the position in the vicinity of the cassette insertion port to the position in which the signals can be recorded on and/or reproduced from the recording medium by means of the moving mechanism in accordance with an output of the judging means.

These and other objects, features and advantages of the invention will become more apparent upon reading the following detailed description with reference to the accompanying drawings.

BRIEF DESCRIPTION OF THE DRAWINGS

FIGS. 2(A) through 2(D) are views each showing a cassette holding member; FIG. 2(A) is a front view thereof; FIG. 2(B) is a plan view thereof; and FIGS. 2(C) and 2(D) are side views thereof;

DETAILED DESCRIPTION OF THE PREFERRED EMBODIMENTS:

One embodiment of the present invention will hereinafter be described.

Figure 1:
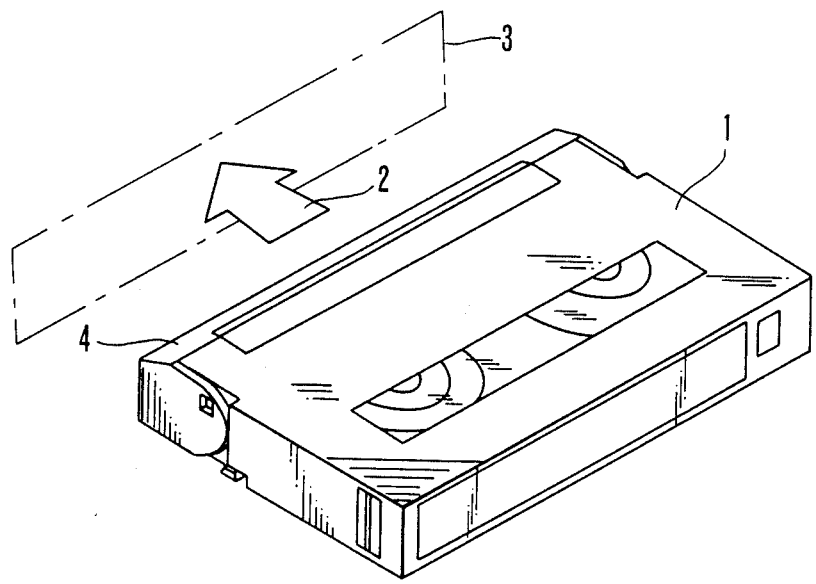
FIG. 1 is a view showing a situation in which a cassette is inserted.
Figure 3:
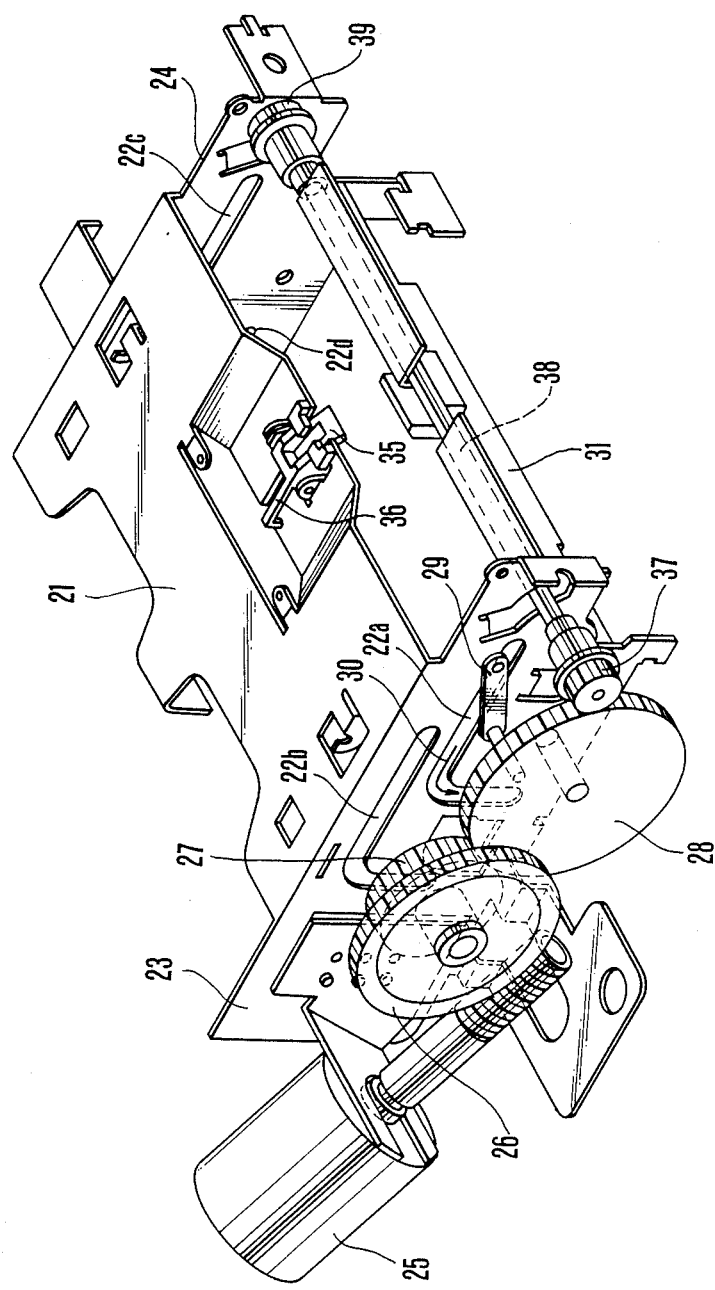
FIG. 3 is a view showing a holder driving mechanism.

FIGS. 2(A) to 2(D) are views of a cassette holder of a VTR, showing one embodiment of the present invention. FIG. 3 is a view of a driving mechanism of the cassette holder illustrated in FIGS. 2(A) to 2(D). In the FIGS. the reference numeral 10 denotes a holder body, 11 represents a crooked portion formed on the side of insertion of the cassette; 12a, 12b designate stoppers for stopping the end portions of the cassette; 13a, 13b stand for side walls which are so formed as to be integral with the holder body 10; and 14a, 14b, 15a, 15b denote driving shafts driven by a cassette driving mechanism.

In FIG. 3, the numeral 21 represents a driving mechanism body; and 22a, 22b denote guide grooves, formed in a side plate 23 of the mechanism body 21, for receiving the driving shafts 14a, 15a. It is to be noted that guide grooves 22c, 22d in which the shafts 14b 15b are fitted are likewise formed in a side plate 24 standing vis-a-vis with the former side plate 23. The numeral 25 designates a motor the rotation of which is conveyed via idler wheels 26, 27 to a rotary disk 28; and 29 represents a connecting bar for connecting an outer diameter portion of the rotary disk 28 to the driving shaft 14a. When the rotary disk 28 rotates counterclockwise, the driving shaft 14a moves through the connecting bar 29 in a direction indicated by an arrowheard 30 of the Figure. The rotation of the rotary disk 28 is propagated through a gear 37, a rotary shaft 38 of the gear 37 and a gear 39 to a rotary disk 50 (see, FIG. 4A) rotatably attached to the side plate 24. Connection to the driving shaft 14b is made with the aid of a lever fitted to the rotary disk 50. With this arrangement, the respective shafts 14a, 15a, 14b, 15b move along the guide grooves 22a, 22b, 22c and 22d.

The numeral 31 represents a window, rotatably and axially supported on the side plates 23, 24, for covering a cassette insertion port 3. The cassette is inserted via the window 31 by the user and then impinges upon the stopper 12a of the holder body 10. When the cassette is further intruded in the inserting direction, a switch which will be mentioned later is turned ON, thereby driving the motor 25. As a result, the driving shaft 14a is guided in a direction pointed by an arrowhead 30 along the guide groove 22a. Then moves the cassette holder body 10 in the inserting direction, and it moves downwards, thus completing operations of the loading of the cassette.

FIGS. 4(A) to 4(E) are explanatory views showing a mechanism for detecting the positions of the cassette holder. The numeral 50 denotes the rotary disk attached to the side plate 24, this rotary disk rotating in the same manner as that of the rotary disk 28. Protrusions 61, 62, 63 for pressing connecting pieces 51, 52 and 53 of switches SW1, SW2, SW3 are formed on the surface of the rotary disk 50. The numeral 60 stands for a base plate provided with the switches SW1, SW2, SW3.

Figure 4A:
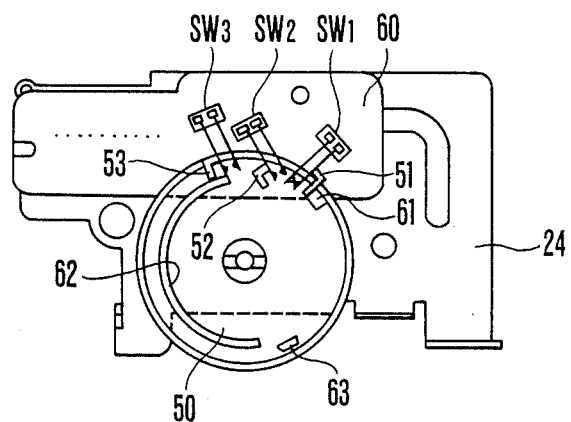
FIGS. 4(A) through 4(E) are views each showing a holder position detecting mechanism.
Figure 4B:
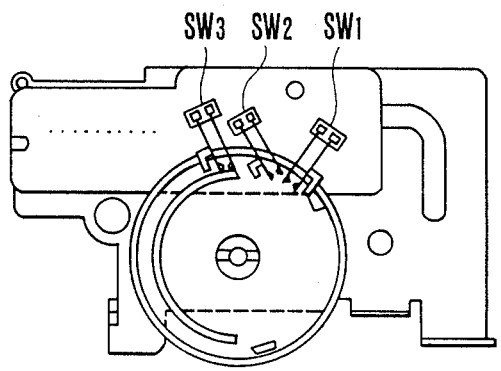

Before inserting the cassette, the rotary disk 50 is in such a state as shown in FIG. 4(A) where the switch SW1 alone is turned ON. Upon impingement of the cassette upon the stoppers 12a, 12b of the holder body 10, the holder body 10 begins to move, and concomitantly the rotary disk 50 starts rotating. At this time, the rotary disk 50 is brought to such a state as shown in FIG. 4(B) where the switch SW1 is turned OFF. When the holder body 10 is further intruded, then the rotary disk 50 comes to a state shown in FIG. 4(C) where the switch SW2 is turned ON. Immediately when the switch SW2 is turned ON, the motor 25 begins to rotate, thereby launching an automatic loading process of the holder body 10.

Figure 4C:
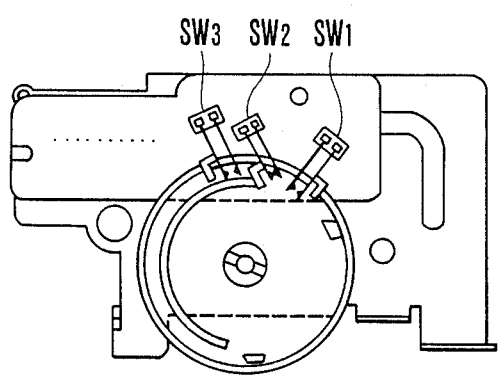
Figure 4D:
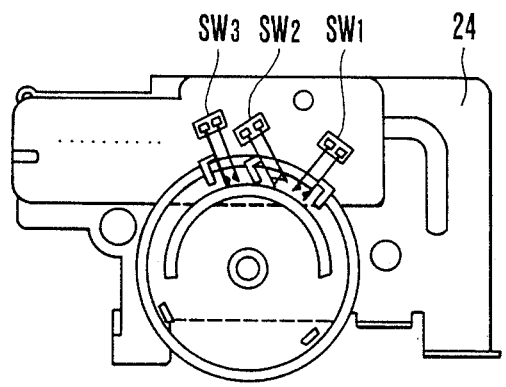
Figure 4E:
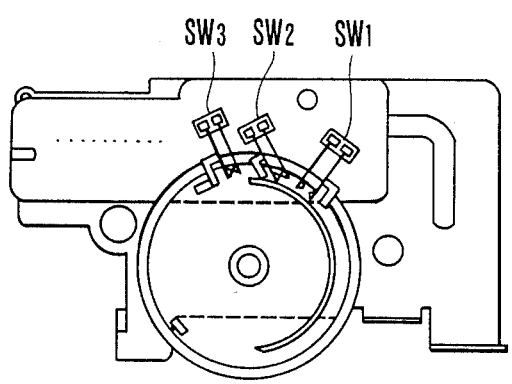

Referring to FIG. 4(D), there is shown a situation of the rotary disk 50 during the loading operation. FIG. 4(E) shows a state of the rotary disk 50 when finishing the loading operation. To be specific, when finishing the loading of the cassette, the switch SW3 is turned ON, whereby the motor 25 ceases to rotate.

On the occasion of taking out the cassette, an unillustrated cassette take-out switch (an eject switch) is pushed, at which time the motor 25 rotates in the direction opposite to that of the loading operation. In consequence, the rotary disk 50 rotates inversely. After the rotary disk 50 has moved to a position shown in FIG. 4(A), and the switch SW1 is turned ON, thereby halting the motor 25. This permits the casseste to revert to the position in which it can be taken out.

Videlicet, the switch SW1 is in the ON-state when the holder body 10 is in the position in which the cassette can be taken out; and the switch SW2 is turned ON when the holder body 10 moves a certain stroke from the position in which the switch SW1 is kept ON in the inserting direction. The switch SW3 is turned ON when the holder is in the position in which the loading of the cassette has been finished.

Figure 5:
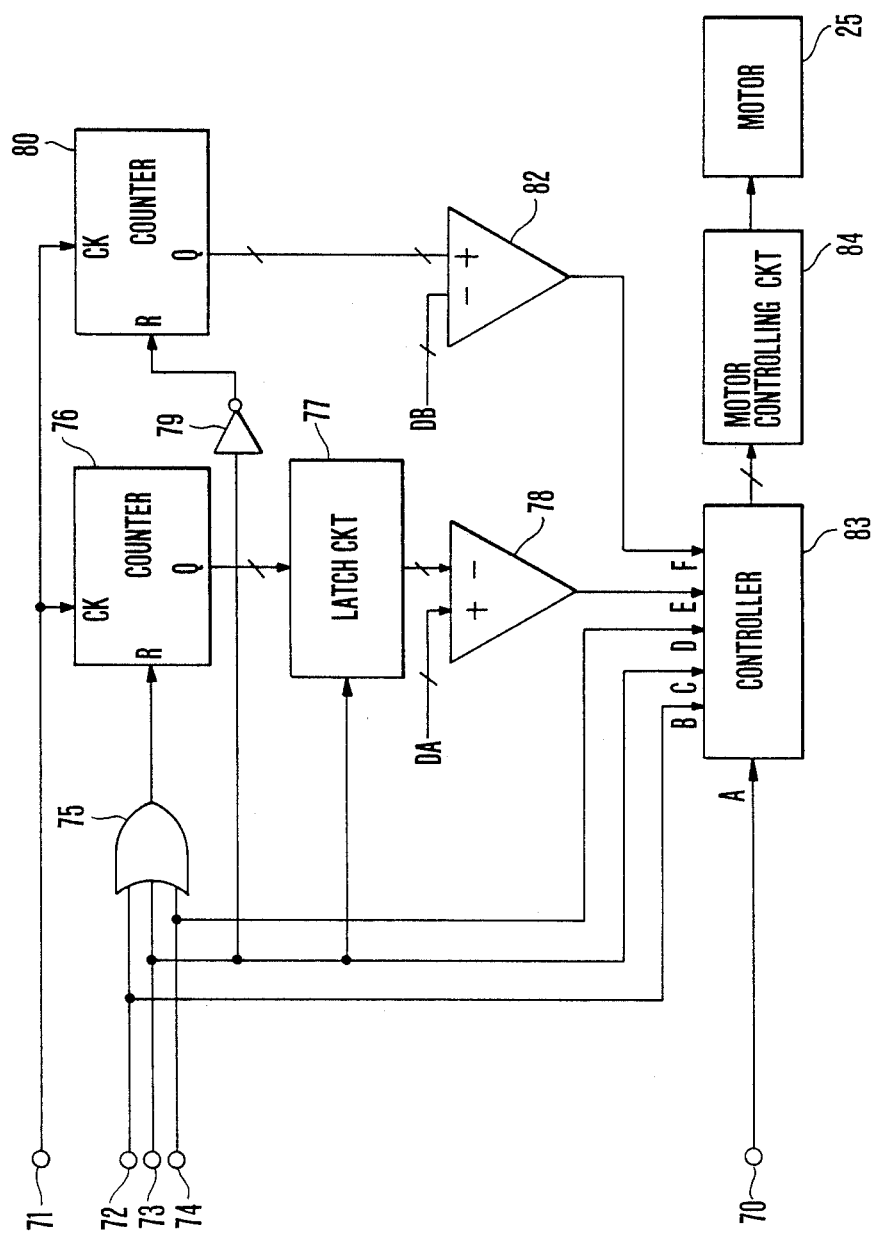
FIG. 5 is a diagram showing a motor controlling circuit.

FIG. 5 shows the controlling circuit of the motor in detail. The numeral 71 stands for a terminal to which clocks each having a given frequency are supplied; 72, 73, 74 denote terminals to which signals assuimg high level when the respective switches SW1, SW2, SW3 are turned ON but assume low level when they are turned OFF are supplied; and 70 designates a terminal to which pulses are imparted at the time of issuing an eject command.

The numeral 75 represents an OR gate which detects a state where all the switches SW1, SW2, SW3 are in the OFF-state. A counter 76 is designed for counting a period for which the state shown in FIG. 4(B) continues. An output of the counter 76 is latched in a latch circuit 77 when the situation illustrated in FIG. 4(B) is changed into the one shown in FIG. 4(C). That is, the latch circuit 77 effects the latching operation at ON-timing of the switch SW2.

Data latched in the latch circuit 77 implies a period for which the situation shown in FIG. 4(B) remains when shifting the state of FIG. 4(A) through the state shown in FIG. 4(B) to the one of FIG. 4(C). If this period is quite short, it is deemed that the cassette has abruptly been intruded by the user. A comparator 78 compares the data latched in the latch circuit 77 with predetermined data $D_A$. If the data $D_A$ is larger than the previous data, the output is sent forth at high level. If the output of the comparator 78 assumes high level, the rotation of the motor 25 is prohibited, and is further driven in the reversed direction, thereby prohibiting the loading of the cassette. The data $D_A$ is so set as to correspond to, for instance, 1/100 sec. or thereabouts.

Owing to this step, it is feasible to prevent creation of damages in the cassette holder as well as in the cassette by loading the cassette after inserting the cassette in an abrupt manner.

In FIG. 3, the numeral 35 represents a protrusion which impinges upon a taper 4 of the cassette 1. When there is no taper 4, this protrusion 35 is intended to steer clear of misinsertion of the cassette. The numeral 36 denotes a resilient member for biasing the protrusion 35 in a direction in which the cassette is intruded. The window 31 is also biased in an open direction thereof.

There is however, a possibility where the situation shown in FIG. 4(C) reverts to the one shown in FIG. 4(B) even at the time of inserting the cassette, this being attributed to the above-described biasing process. Since the cassette begins to be loaded when coming to the state illustrated in FIG. 4(C), it is probable that the cassette is not tightly seized by the holder, if the situation reverts to the one of FIG. 4(B). Hence, damages are likely to be created in the cassette holder body 10, the cassette 1 and so on.

If the situation shown in FIG. 4(C) does not continue for more than a predetermined period, the motor 25 should not be driven. A counter 80 serves to count a period after the switch SW2 has been turned OFF, this counter 80 being reset when the switch SW2 is in the OFF-state. Therefore, after the switch SW2 has been turned ON, if the ON-state remains as it is for a given period of time, it is not till the output of the comparator comes t assume high level that the motor 25 is driven. Thus the automatic loading of the cassette starts. With above-described steps, it is possible to solve the foregoing problems.

Figure 6:
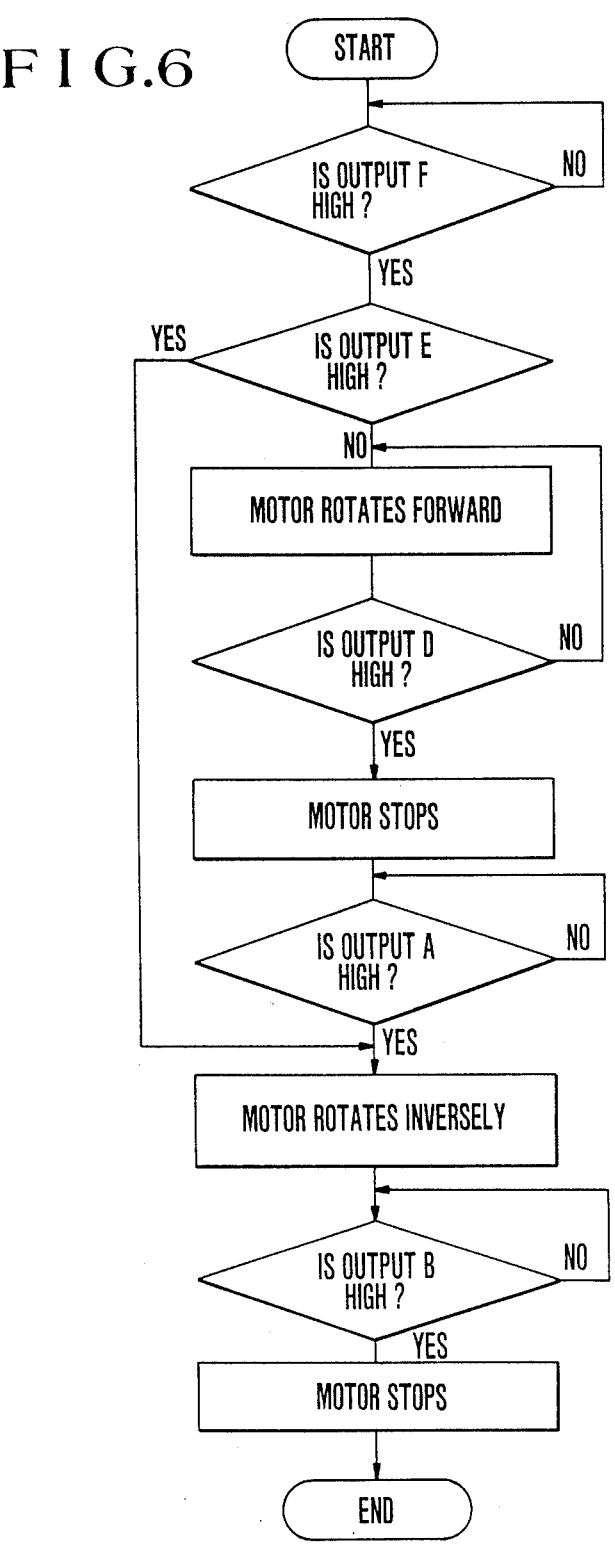
FIG. 6 is a flowchart showing operations of a controller of FIG. 5.

FIG. 6 is a flowchart showing operations of a controller 83 of FIG. 5. In this flowchart, forward rotation of the motor implies the rotation in a direction in which the cassette is loaded, whereas reversed rotation implies tha rotation in a direction in which the cassette is taken out.

According to the above-mentioned constitution, in the event of the cassette's being abruptly inserted, it is feasible to prevent an accident by hindering the loading of the cassette when the cassette returns after insertion. Moreover, inasmuch as three positions of the cassette holder are detected by turning ON/OFF the switches SW1 to SW3 disposed on the same base plate in accompany with the rotation of the rotary disk, the detection of the three positions thereof can be made simply by connecting the cord to the single base plate fixed to the device. This arrangement is highly effective both in simplification and in miniaturization of the device.

In the second place, there will be described another embodiment of the present invention wherein the mechanism for detecting the positions of the cassette holder and the motor driving mechanism in the previous embodiment are modified in terms of constitution.

Figure 7A:
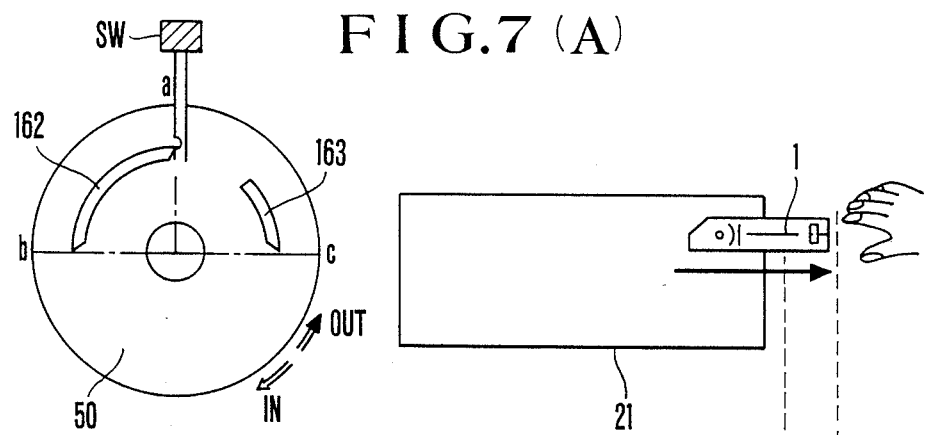
FIGS. 7(A) through 7(C) are explanatory views of a mechanism for detecting positions of the cassette holder, showing another embodiment of the present invention.
Figure 7B:
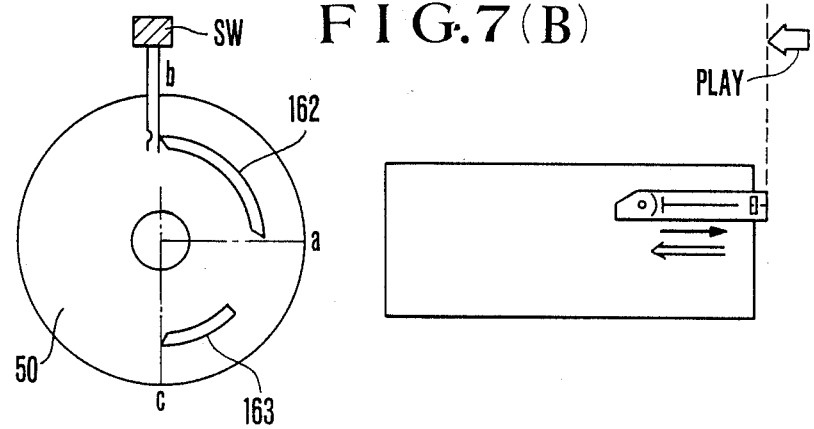
Figure 7C:
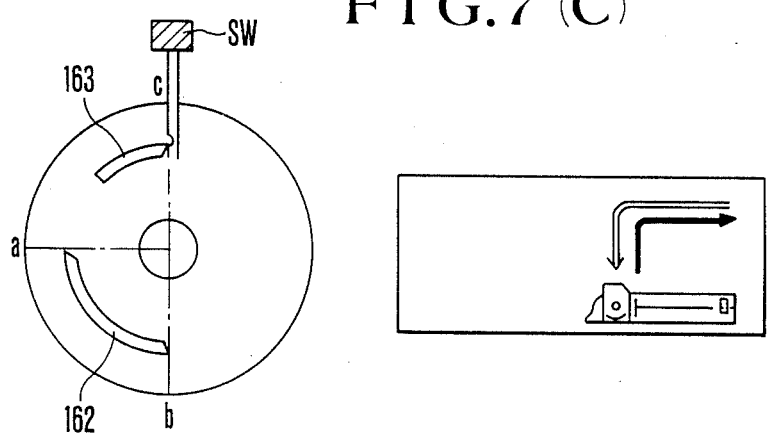

FIGS. 7(A), 7(B), 7(C) are explanatory views of the mechanism for detecting the positions of the cassette holder in this embodiment. In the FIGS., switches and rotational phases of the rotary disk 50 similar to that of the previous embodiment are illustrated to the left hand, while on the other hand the positions of the cassette with respect to the VTR are shown to the right hand.

On the surface of the rotary disk 50 are provided cams 162, 163 for pressing the switch so as to be turned ON/OFF. The switch is fitted to the unillustrated base plate fixed to the side plate 24.

Before inserting the cassette, the rotary disk 50 is in such a state as shown in FIG. 7(A), and the switch SW is in an OFF-state. Upon insertion of the cassette, the rotary disk 50 begins to rotate clockwise in the FIG., whereby the switch SW is turned ON by the cam 162. When the rotary disk 50 rotates through a predetermined angle by virtue of the insertion, the same disk 50 is brought to a state illustrated in FIG. 7(B). Then the cam 162 comes off from the switch SW, and the switch SW is turned OFF. As will be stated later, the motor 25 is actuated just when coming to the state shown in FIG. 7(B) during insertion of the cassette, thereby permitting the cassette holder to be driven. By dint of the drive of this cassette holder, the rotary disk 50 further rotates clockwise to such an extent that it reaches to a state shown in FIG. 7(C), and subsequently the switch SW is turned ON this time by the cam 163. At this time, the cassette has completely been loaded and hence the motor 25, as will be mentioned later, halts.

On the other hand, when the eject switch is turned ON in the state of FIG. 7(C), the situation reverts through the state of FIG. 7(B) to the one shown in FIG. 7(A), thereby stopping the motor 25.

Figure 8:
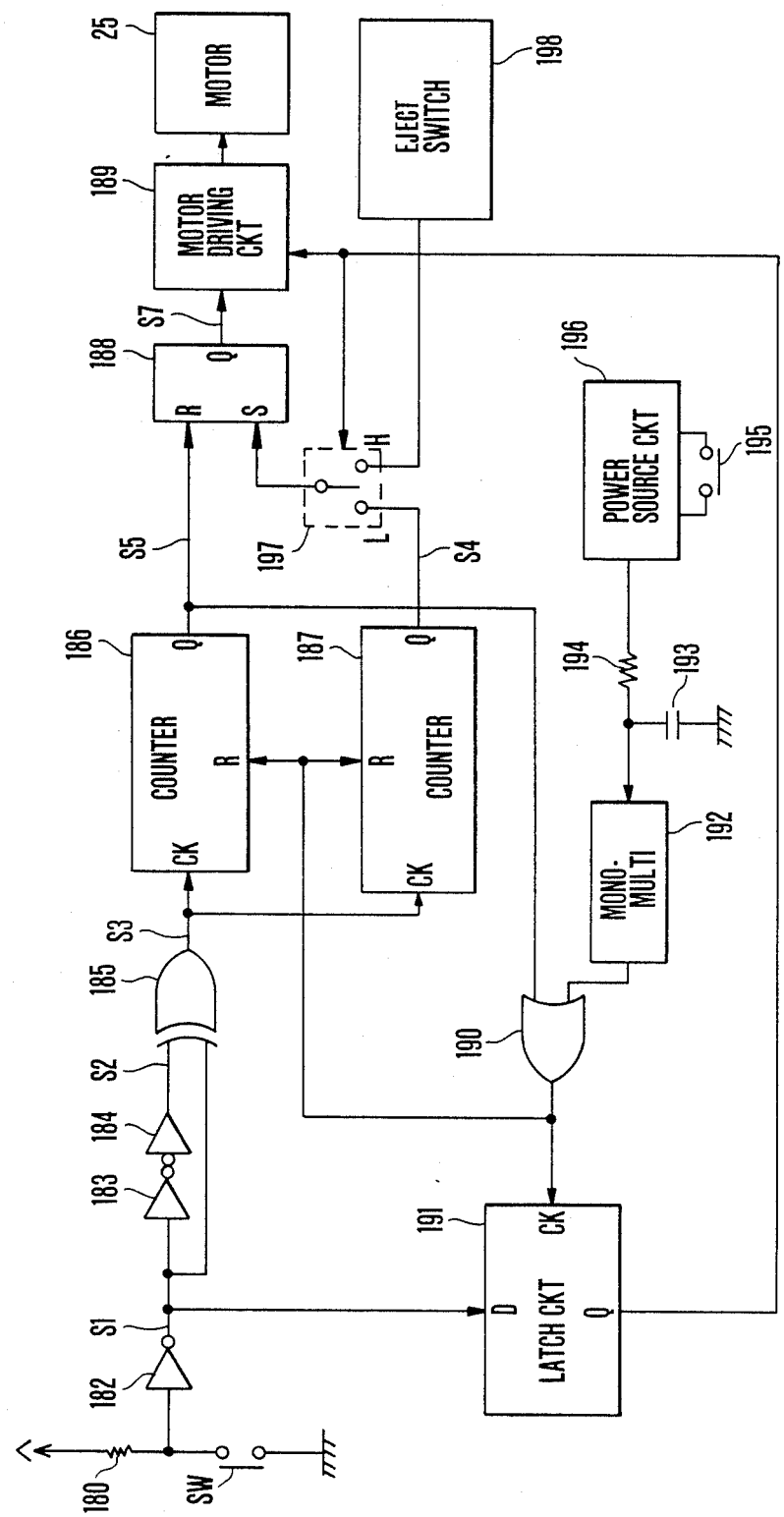
FIG. 8 is a diagram showing a controlling circuit of a cassette holder driving motor of a VTR in the embodiment of the present invention.
Figure 9A:
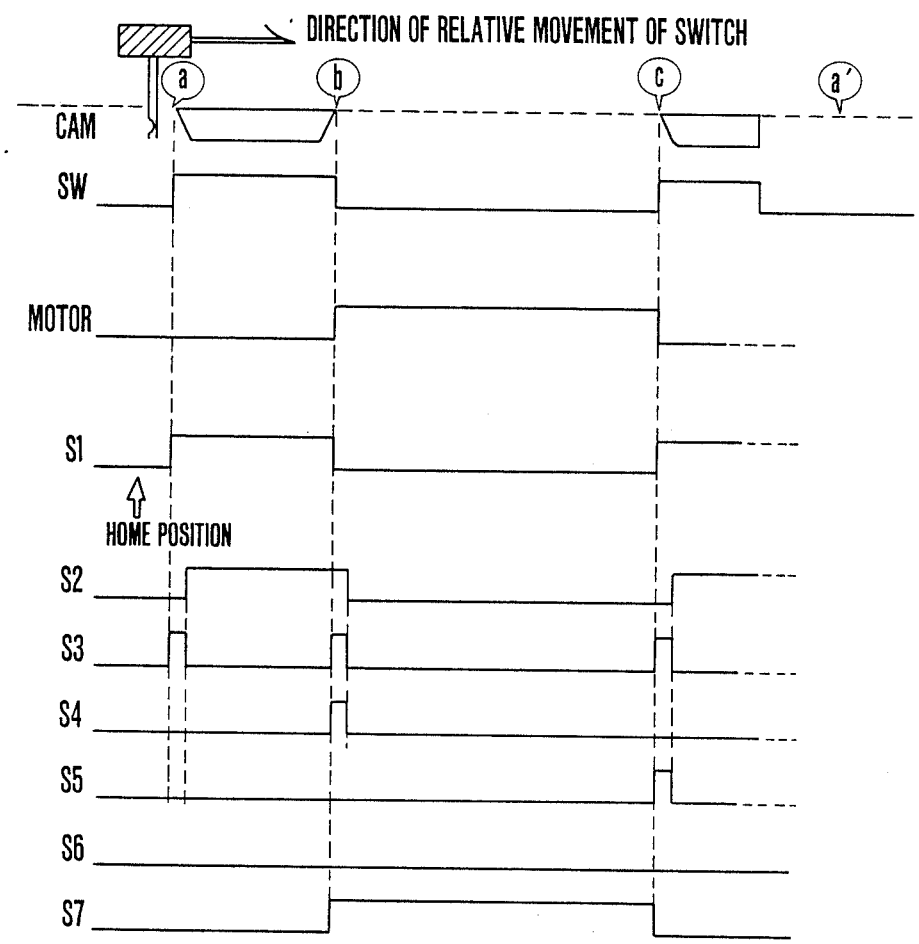
FIGS. 9(A) and 9(B) are timing charts each showing operations of individual components of FIG. 8.
Figure 9B:
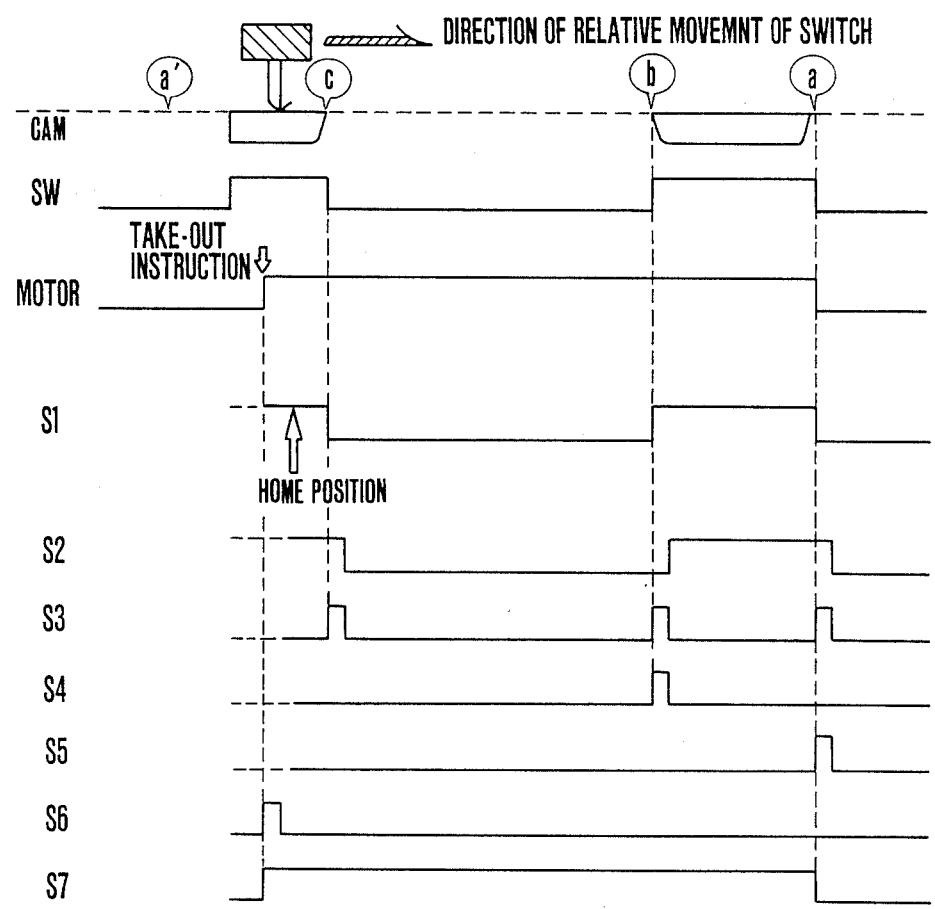

FIG. 8 shows a controlling circuit of the motor 25, and FIGS. 9(A), 9(B) are timing charts each showing operations of the controlling circuit. FIG. 9(A) shows a situation when inserting the cassette, and FIG. 9(B) shows a situation when taking out the cassette. In the FIGS. the reference symbol SW indicates an ON/OFF state of the switch; MOTOR shows a driving state of the motor; and $S_1$ through $S_7$ indicate waveforms of the respective parts of components of FIG. 8.

When a power source is inputted to the VTR by turning ON a power source switch 195, a signal outputted by a power source circuit 196 comes to assume high level, and a mono-multi (M.M.) 192 is triggered through a time constant circuit consisting of a resistance 194 and a capacity 193. Counters 186, 187 are reset through an OR gate 190 by dint of the output of the mono-multi 192.

If the cassette still remains uninserted in inputting the power source, the switch SW is deemed to be in the OFF-state. IN the case of performing the loading of the cassette, the switch SW is in the ON-state. Consequently, the signal assuming high level (Hi) is latched in a latch circuit 191 by the output of the mono-multi 192. A signal marked with S1 in the FIG. comes to assume high level (Hi) by inverting low level (Lo) based on the earth during a period for which the switch SW is turned On, whereas the signal S1 assumes the low level (Lo) by inverting the high level (Hi) based on a power source voltage through the intermediary of a resistance 180 while being turned OFF.

The outputs of the latch circuit 191 are supplied to the switch 197 and to the motor driving circuit 189, thereby changing over both the driving direction of the motor 25 by the motor driving circuit 189 and the switch 197. Namely, the output of the latch circuit 191 implies a signal for changing over a mode of this controlling circuit during a period between the time of inserting the cassette and the time of taking out the cassette.

To start with, where the switch SW is in the OFF-state, the operations required when inserting the cassette will be explained with reference to FIG. 9(A).

The cassette 1 is inserted by the user, and the rotary disk 50 is brought to a state shown in FIG. 7(A), at which time the switch SW is turned ON. Subsequently, the level of the output signal S1 of the inverter 182 chages from Lo to Hi. An edge detection circuit composed by inverters 183,184 and by an exclusive OR circuit (EXOR) 185 detects edges of the signal S1, and the thus detected edges are inputted to the counters 186, 187. The inverters 183, 184, as is obvious from S2 of FIG. 9(A), function as a delay circuit for an exremely short period of time.

The counters 186, 187 respectively count three or two pieces of pulses and at the same instant send forth a Q-output at the high level Hi. Hence, when the rotary disk 50 comes to the state shown in FIG. 7(B) in accompany with the insertion of the cassette, the second pulse is present in an output S3 of the EXOR 185, whereby the level of the Q-output varies into Hi. At this time, the switch 197 is connected to an L-side, and a flip flop (FF) 188 is set. An output S7 of this flip flop 188 assumes the high level Hi. The output S7 of the FF 188 is supplied to the motor driving circuit 189 and the motor 25 is thereby driven.

The cassette is loaded by this motor 25, and when the rotary disk 50 is brought to the state illustrated in FIG. 7(C), the third pulse is outputted from the EXOR 185. In consequence, the Q-output of the counter 186 becomes Hi. The FF 188 is reset by dint of the Q-output S5 of the counter 186, and an output S7 assumes the low level Lo, thereby halting the motor which is driven by the motor driving circuit 189. The loading of the cassette is thus completed. At this time, the counters 186, 187 are reset by dint of the Q-output S5 of the counter 186, and at the same moment the latch pulses are fed to the latch circuit 191 where the signals having the high level Hi are latched. As a result, a cassette take-out standby state is created.

The operations needed when taking out the cassette will be described. Upon an operation of an eject switch 198 from a state in which the cassette has completely been loaded, the output of the eject switch 198 is transmitted via an H-side terminal of the switch 197, whereby the FF 188 is set. Then the output S7 comes to assume the high level Hi, and the motor 25 starts driving the cassette holder with the help of the motor driving circuit 189. During a period for which the rotary disk 50 reverts through the states shown in FIGS. 7(C), 7(B) to the state of FIG. 7(A), three pieces of pulses are, as illustrated in FIG. 9(B), outputted from the EXOR 185, and the Q-output S5 of the counter 186 becomes Hi. In the wake of this step, the FF 188 is immediately reset, this permitting the output S7 to assume the low level Lo. Subsequently, the motor 25 ceases in the state of FIG. 7(A). At this time, the counters 186, 187 are reset by dint of the output S5, and the latch circuit 191 latches Lo, thereby returning to the cassette loading standby state.

In the above-described VTR, it is possible to detect the three positions of the cassette holder at the time of its being driven as well as the states of the cassette holder at the time of inputting the power source by making use of the single switch and the small-sized logical circuit. Furthermore, it is feasible to effect the controlling process when loading and taking out the cassette.

In the above-described embodiments, the motor is controlled by the logical circuit. However, program control becomes possible by supplying the output of the EXOR 185 to a microcomputer of one chip. In this case, since a CPU for system control which is employed in other parts of the VTR can serve double purposes, a further decrease both in weight and in size can be obtained.

What is claimed is:

1. A cassette loading device, comprising:
   (a) a holding member for holding a cassette containing a recording medium;
   (b) a moving mechanism for moving said holding member between a position for locating said cassette near a cassette inserting port of a recording and/or reproducing device and a position where a signal can be recorded and/or reproduced by said recording and/or reproducing device on said recording medium;
   (c) a rotary member arranged to be rotated in association with movement of said holding member, said rotary member having a first cam disposed thereon and a second cam disposed thereon at a radially different position from said first cam; and
   (d) detecting means for detecting the fact that said holding member is located at a first position and a second position, respectively, by detecting a phase of rotation of said rotary member, said detecting means having a first switch arranged to be operated by said first cam when said holding member is located at said first position and a second switch arranged to be operated by said second cam when said holding member is located at said second position.

2. A device according to claim 1, wherein said first position is the position near said cassette inserting port and said second position is the position where the signal can be recorded and/or reproduced by said recording and/or reproducing device on said recording medium.

3. A device according to claim 2, wherein said moving mechanism includes a motor for supplying a driving force to move said holding member, and said moving mechanism is arranged to start to drive said motor, in response to detection by said detecting means of the fact that said holding member is located at the first position, thereby enabling start of the movement of said holding member from said first position to said second position.

4. A device according to claim 3, wherein said moving mechanism is arranged to stop said motor to stop movement of said holding member from said first position to said second position, in response to detection by said detecting means of the fact that said holding member is located at said second position during movement of said holding member from said first position to said second position.

5. A device according to claim 3, wherein said rotary member includes a third cam and said detecting means further includes a third switch arranged to be operated by said third cam when said holding member is located at a third position, in order to detect the fact that said holding member is located at the third position, said third position being located more to an outer side of said cassette inserting port than said first position.

6. A device according to claim 5, wherein said third cam is located at a radially different position of said rotary member from the position of said first cam.

7. A device according to claim 5, wherein said moving mechanism includes a motor for supplying a driving force to move said holding member and it is arranged to stop said motor to stop movement of said holding member from said second position to said third position, in response to detection by said detecting means of the fact that said holding member is located at said third position during movement of said holding member from said second position to said third position.

8. A device according to claim 7, further comprising: eject instructing means for giving an instruction to eject said cassette.

9. A device according to claim 8, wherein said moving mechanism is arranged to start to drive said motor to start movement of said holding member from said second position to said third position, in accordance with the eject instruction given by said eject instructing means when said detecting means detects that said holding member is positioned at said second position.

10. A device according to claim 5, further comprising:
judging means for judging whether the time required from detection by said detecting means of the fact that said holding means is located at said third position to detection of the fact that said holding means is located at said first position during the movement of said holding member from said third position to said second position is within a predetermined time or not.

11. A device according to claim 10, wherein said moving mechanism is arranged to prohibit start of movement of said holding means from said first position to said second position depending upon detection by said detecting means of the fact that said holding means is located at the first position, when said deciding means has decided that the above-mentioned time required is within said predetermined time.

12. A device according to claim 10, wherein said moving mechanism is arranged to move said holding member from said first position to said third position when said judging means has judged that said time required is within said predetermined time.

13. A device according to claim 5, wherein said first, second and third switches are disposed on a same substrate fixed in said recording and/or reproducing device.

14. A cassette loading device comprising:
(a) a holding member for holding a cassette containing a recording medium;
(b) a moving mechanism for moving said holding member between a position for locating said cassette near a cassette inserting port of a recording and/or reproducing device and a position where a signal can be recorded and/or reproduced by said recording and/or reproducing device on said recording medium;
(c) a rotary member arranged to be rotated in association with movement of said holding member, said rotary member having a first cam disposed thereon, a second cam disposed thereon and a third cam disposed thereon; and
(d) detecting means for detecting the fact that said holding member is located at a first position, a second position and a third position, respectively, by detecting a phase of rotation of said rotary member, said detecting means having a switch arranged to be operated by said first cam when said holding member is located at said first position, operated by said second cam when said holding member is located at said second position, and operated by said third cam when said holding member is located at said third position;
wherein said first position is the position near said cassette inserting port, said second position is the position where the signal can be recorded and/or reproduced by said recording and/or reproducing device on said recording medium, and said third position is located more to an outer side of said cassette inserting port than said first position.

15. A device according to claim 14, wherein said moving mechanism includes a motor for supplying a driving force to move said holding member and it is arranged to stop said motor to stop movement of said holding member from said second position to said third position, in response to detection by said detecting means of the fact that said holding member is located at said third position during movement of said holding member from said second position to said third position.

16. A device according to claim 14, wherein said moving mechanism includes a motor for supplying a driving force to move said holding member, and said moving mechanism is arranged to start to drive said motor, in response to detection by said detecting means of the fact that said holding member is located at the first position, thereby enabling start of the movement of said holding member from said first position to said second position.

17. A device according to claim 16, wherein said moving mechanism is arranged to stop said motor to stop movement of said holding member from said first position to said second position, in response to detection by said detecting means of the fact that said holding member is located at said second position during movement of said holding member from said first position to said second position.

18. A cassette loading device, comprising:
(a) a holding member for holding a cassette containing a recording medium;
(b) a moving mechanism for moving said holding member between a position for locating said cassette near a cassette inserting port of a recording and/or reproducing device and a position where a signal can be recorded and/or reproduced by said recording and/or reproducing device on said recording medium;
(c) detecting means for detecting the fact that said holding member is located at a first position, second position and a third position, respectively, said first position being the position near said cassette inserting port, said second position being the position where the signal can be recorded and/or reproduced by said recording and/or reproducing device on said recording medium and said third position being the position located more to an outer side of said cassette inserting port than said first position;

(d) judging means for judging whether the time required from detection by said detecting means of the fact that said holding means is located at said third position to detection of the fact that said holding means is located at said first position during the movement of said holding member form said third position to said second position is within a predetermined time or not; and (e) prohibiting means for prohibiting start of movement of said holding member by said moving mechanism from said first position to said second, when said judging means has judged that the above-mentioned time required is within said predetermined time.

19. A cassette loading device, comprising:

(a) a holding member for holding a cassette containing a recording medium;

(b) a moving mechanism for moving said holding member between a position for locating said cassette near a cassette inserting port of a recording and/or reproducing device and a position where a signal can be recorded and/or reproduced by said recording and/or reproducing device on said recording medium;

(c) detecting means for detecting the fact that said holding member is located at a first position, a second position and a third position, respectively, said first position being the position near said cassette inserting port, said second position being the position where the signal can be recorded and/or reproduced by said recording and/or reproducing device on said recording medium and said third position being the position located more to an outer side of said cassette inserting port than said first position;

(d) judging means for judging whether the time required from detection by said detecting means of the fact that said holding means is located at said third position to detection of the fact that said holding means is located at said first position during the movement of said holding member form said third position to said second position is within a predetermined time or not; and (e) control means for causing said moving mechanism to move said holding member from said first position to said third position, when said judging means has judged that the above-mentioned time required is within said predetermined time.

* * * * *